Aug. 24, 1965

D. R. WARNER 3,202,235

INDEPENDENT VEHICLE SUSPENSION SYSTEM

Filed Aug. 20, 1963

DENNIS R. WARNER
Inventor

By John R. Faulkner
Clifford L. Sadler

Attorneys

Aug. 24, 1965  D. R. WARNER  3,202,235
INDEPENDENT VEHICLE SUSPENSION SYSTEM
Filed Aug. 20, 1963  3 Sheets-Sheet 3

DENNIS R. WARNER
Inventor

By John R. Faulkner
Clifford L. Sadler

Attorney

United States Patent Office 3,202,235
Patented Aug. 24, 1965

3,202,235
INDEPENDENT VEHICLE SUSPENSION SYSTEM
Dennis R. Warner, Northfield, Birmingham, England, assignor to Ford Motor Company, Dearborn, Mich., a corporation of Delaware
Filed Aug. 20, 1963, Ser. No. 303,309
1 Claim. (Cl. 180—73)

This invention relates to motor vehicle suspension systems and more particularly to independent suspensions.

In a motor vehicle suspension constructed according to the preferred embodiment of this invention, a differential gear unit is secured to the vehicle chassis and has a pair of laterally extending driving half-shafts universally connected thereto. Left and right road wheels are drivingly connected to the outer ends of the half-shafts and longitudinally extending leaf springs are provided adjacent each of the road wheels. A bearing housing rotatably supports the outer end of each of the half-shafts and, in turn, is pivotally connected to the adjacent leaf spring. If desired, a brake backing plate may be secured to the bearing housing.

With this arrangement, when the half-shaft swings through an arc during jounce and rebound movement of the road wheel, the pivotal connection between the spring and the bearing housing will reduce the tendency of a torsional twist being imparted to the leaf spring.

The particular manner in which the many objects and advantages of this invention are achieved will be described in connection with the accompanying drawings in which, FIGURE 1 is a diagrammatic side elevation of an independent rear suspension constructed according to this invention;

Figure 1:
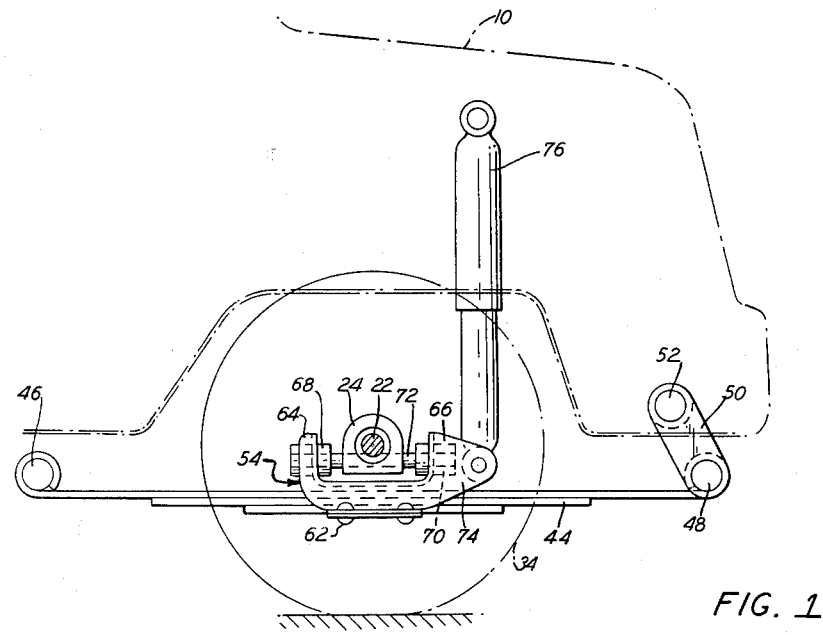
Figure 2:
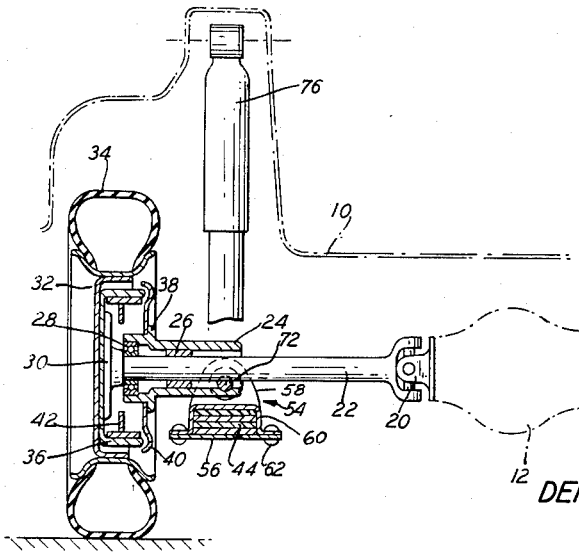
FIGURE 2 is a diagrammatic end elevation of the suspension of FIGURE 1.
Figure 3:
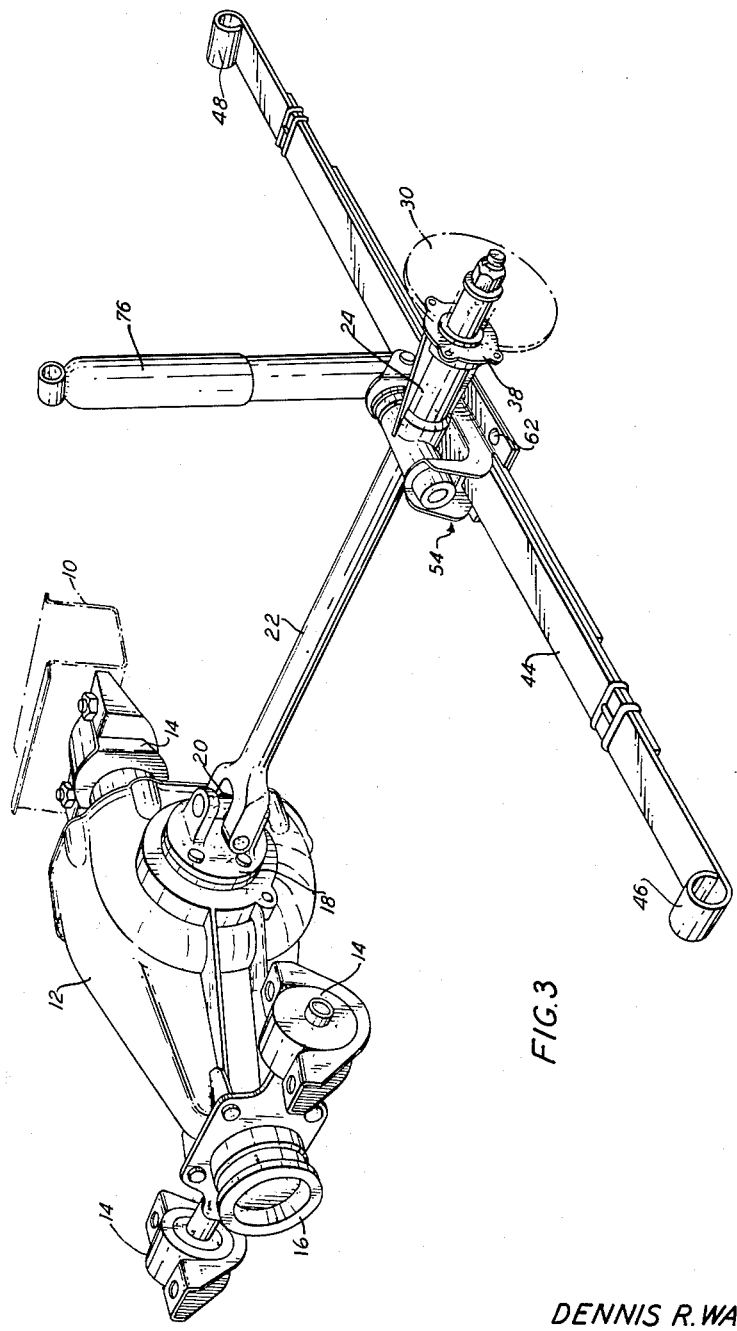
FIGURE 3 is a perspective view of the suspension.

Referring now to the drawings for a more complete understanding of the present invention, FIGURES 1, 2 and 3 disclose an automotive independent suspension system of the leaf spring type.

A vehicle body 10 is provided with an integral frame for supporting chassis components. The body 10 may, in the alternative, be of separate body and frame construction. A differential gear unit 12 is connected to the body 10 by means of three resilient mounts 14. The differential 12 receives power at its forward end or input 16 from an automotive engine and driveline (not shown) in a conventional fashion. Power received by the differential 12 is distributed through left and right output flanges 18 that connect through a universal joint 20 with left and right driving half-shafts 22. The half-shaft and related suspension are identical for the left and right sides and, therefore, only the construction for the left side is disclosed.

The drive shaft 22 is rotatably supported at its outer end by a bearing housing 24. The bearing housing 24 has a pair of bearings that comprise an inner bushing 26 and an outer ball bearing 28. The outer end of the drive shaft 22 has a flange 30 secured thereto. A brake drum 36 is fastened to the flange 30 and a wheel 32 is bolted to both the drum 36 and the flange. A tire 34 is mounted on the wheel 32.

The bearing housing 24 has a flange 38 to which a brake backing plate 40 is secured. Brake shoes 42 are movably connected to the backing plate 40 and are adapted to engage the inner surface of the brake drum 36.

A longitudinally extending leaf spring 44 has a forward eye 46 that is connected to the vehicle body 10 in a conventional fashion by an elastic bushing and bracket (not shown). A spring shackle 50 is pivotally connected at its lower end to the rear spring eye 48. Upper end 52 of shackle 50 is pivotally connected to the vehicle body 10.

As disclosed in FIGURES 1, 2 and 3, a clamp assembly 54 rigidly secures the individual leaves of the spring 44 together and provides a means for connecting the bearing housing 24 with the spring 44. The clamp assembly comprises a lower plate 56 situated beneath the spring 44. A sheet metal stamping 58 has a channel-shaped body portion 60 with laterally extending side flanges that are connected to the lower plate 56 by rivets 62. The ends of the channel-shaped body 60 are turned upwardly at 64 and 66 in order that bearings 68 and 70 may be secured thereto. A shaft 72 is pivotally supported in the bearings 68, 70 and is secured to the bearing housing 24.

An extension 74 from the rear bearing support 66 provides an attachment location for a shock absorber 76. Shock absorber 76 is of the telescopic type and has a pivotal connection to the clamp assembly 54 at the portion 74. The upper end of the shock absorber 76 is secured to vehicle body structure in a conventional fashion.

With the suspension of FIGURES 1, 2 and 3, when the wheel and tire assembly 32, 34 moves vertically in jounce and rebound, the half-shafts 22 will swing through an arc about the universal joint 20. The shaft 72 of the pivotal coupling will rotate in the bearings 68, 70 to allow for angular displacement between the half-shafts 22 and the bracket assembly 54. There is also a slight lateral movement, relatively speaking, between the swinging half-shaft 22 and the leaf spring 44 and the latter will be twisted to allow for the change in distance between the clamp assembly 54 and the inner universal joint 20. The tendency to twist, however, will not be nearly as great as if there were a rigid connection between the bearing housing 24 and the clamp assembly 54.

Figure 4:
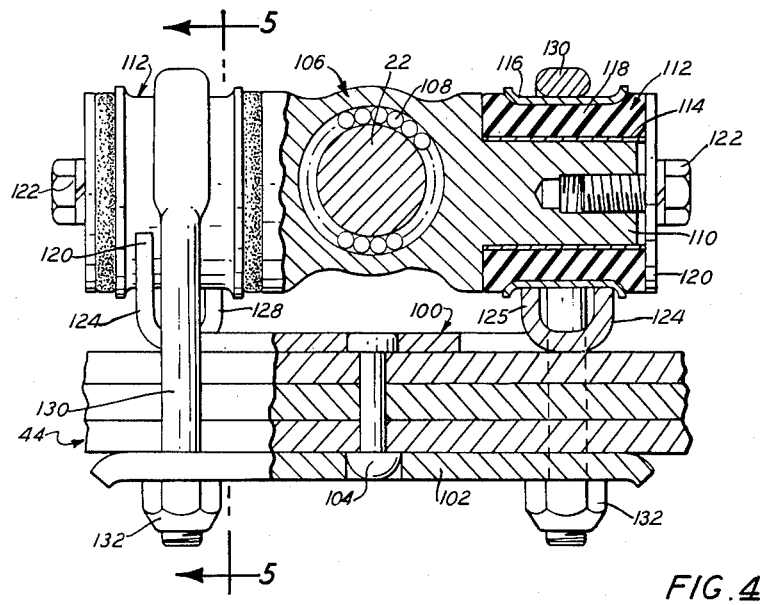
FIGURE 4 is a partial section through a modification of the suspension of FIGURE 1.
Figure 5:
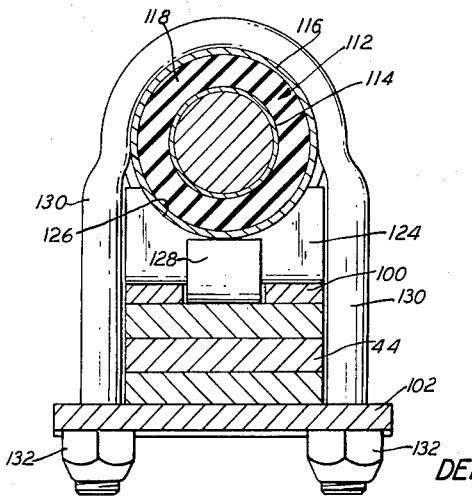
FIGURE 5 is a section taken on the section line 5—5 of FIGURE 4.

FIGURES 4 and 5 disclose an alternate form of the invention and, particularly, of the connection between the shaft 22 and the leaf spring 44. In this embodiment, the leaf spring 44 is sandwiched between upper and lower spring plates 100 and 102. A centering bolt 104 secures the several leaves of the spring 44 together and cooperates with apertures in the plates 100 and 102 to locate them longitudinally on the spring 44.

As in the previous embodiment, a bearing housing 106 is provided to rotatably support the shaft 22. FIGURE 4 discloses one of the bearings 108 for supporting the shaft 22. The housing 106 has narrow diameter end portions that extend forwardly and rearwardly. An elastic bushing assembly 112 is positioned about each of the end portions 110. Each of the elastic bushings 112 comprise inner and outer metallic sleeves 114 and 116 that are separated by an elastic sleeve 118. The elastic bushings 112 are positioned upon the ends 110 by washers 120 that are held in place by bolts 122.

The upper plate 100 has its ends bent upwardly to form flanges 124. Circular recesses 126 are formed in the upstanding flanges 124 to receive the outer cylindrical member 116 of the elastic bushing assemblies 112. Tabs 125 and 128 are also bent out of the body portion of the upper plate 100 for support of the elastic bushings 112. A U-bolt 130 circles each of the bushings 112 and has its leg portions extending downwardly through the lower plate 102 to which it is attached by nuts 132.

The U-bolts 130 not only secure the elastic bushing 112 of the bearing housing 106 to the leaf springs 44, but they also secure the several leaf elements of the spring 44 and clamp assembly together in a tight sandwich.

The embodiment of FIGURES 4 and 5 has the advantage of not only permitting angular displacement between the shaft 22 and the spring 44 but, in addition, the rubber element 118 of the front and rear elastic bushings 112 permit slight longitudinal movement of the axle 22 and the wheel connected thereto. In other words, when the wheel secured to the end of the axle 22 of the FIGURES 4 and 5 embodiments strikes an obstacle, the rubber 118 will be loaded in shear and will permit some longitudinal displacement. This longitudinal movement is sometimes referred to as wheel recession and is highly advantageous as it reduces an undesirable riding quality known as harshness. Thus, not only is a simple, inexpensive suspension system provided that eliminates the binding that might occur due to the angular displacement between the shaft 22 and the spring 44, but also riding qualities are improved due to the presence of the rubber bushings and their being loaded in shear.

The foregoing description presents the presently preferred embodiments of this invention. Alterations and modifications may occur to those skilled in the art that will come within the scope and spirit of the following claim.

I claim:

A motor vehicle suspension comprising a vehicle frame, a differential gear unit secured to said frame, driving shafts extending laterally from the left and right side of said unit, universal joints connecting the inner ends of said shafts to the outputs of said unit, a road wheel rigidly secured to the outer end of each of said shafts, housing means rotatably supporting the outer end of each of said shafts, a longitudinally extending leaf spring having its ends pivotally connected to said frame and spaced inwardly from each of said wheels, a centrally situated clamp secured to each of said springs, pivot means having a longitudinal pivot axis interconnecting each of said housing means and a said clamp, said pivot means comprising a pair of spaced apart elastic bushing assemblies adapted to permit longitudinal shaft movement parallel to said spring as well as pivotal movement about a longitudinal axis, the pivot axis of each of said bushing assemblies being arranged to intersect one of said drive shafts, a telescopic hydraulic shock absorber having its upper end connected to said frame and its lower end pivotally connected to one of said clamps.

References Cited by the Examiner

UNITED STATES PATENTS

| | | | |
|---|---|---|---|
| 652,940 | 7/00 | Whitney | 180—73 X |
| 739,993 | 9/03 | Decker | 180—73 |
| 2,621,920 | 12/52 | Hogsten et al. | 180—73 X |
| 2,762,445 | 9/56 | Polhemus et al. | 180—73 |
| 3,064,750 | 11/62 | Buchwald | 180—73 |
| 3,103,349 | 9/63 | Palajac | 180—73 X |

FOREIGN PATENTS

| | | |
|---|---|---|
| 770,709 | 7/34 | France. |
| 420,166 | 11/34 | Great Britain. |
| 966,829 | 9/57 | Germany. |

A. HARRY LEVY, *Primary Examiner.*